March 24, 1936.  F. J. WESTROPE  2,034,849
VISOR NESTED IN RECESS OF HEADER PANEL
Filed April 13, 1932
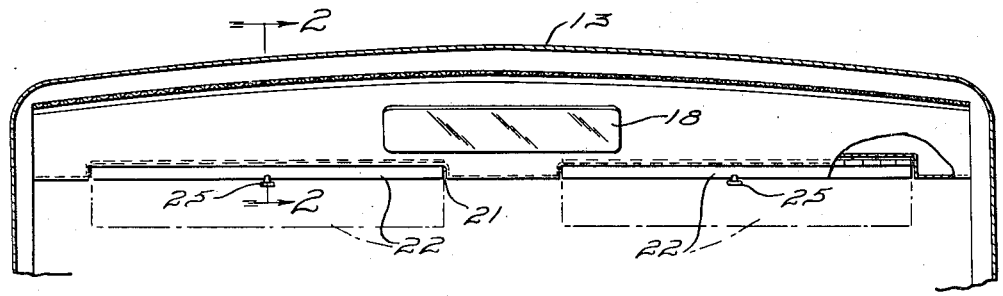
Fig. 1.
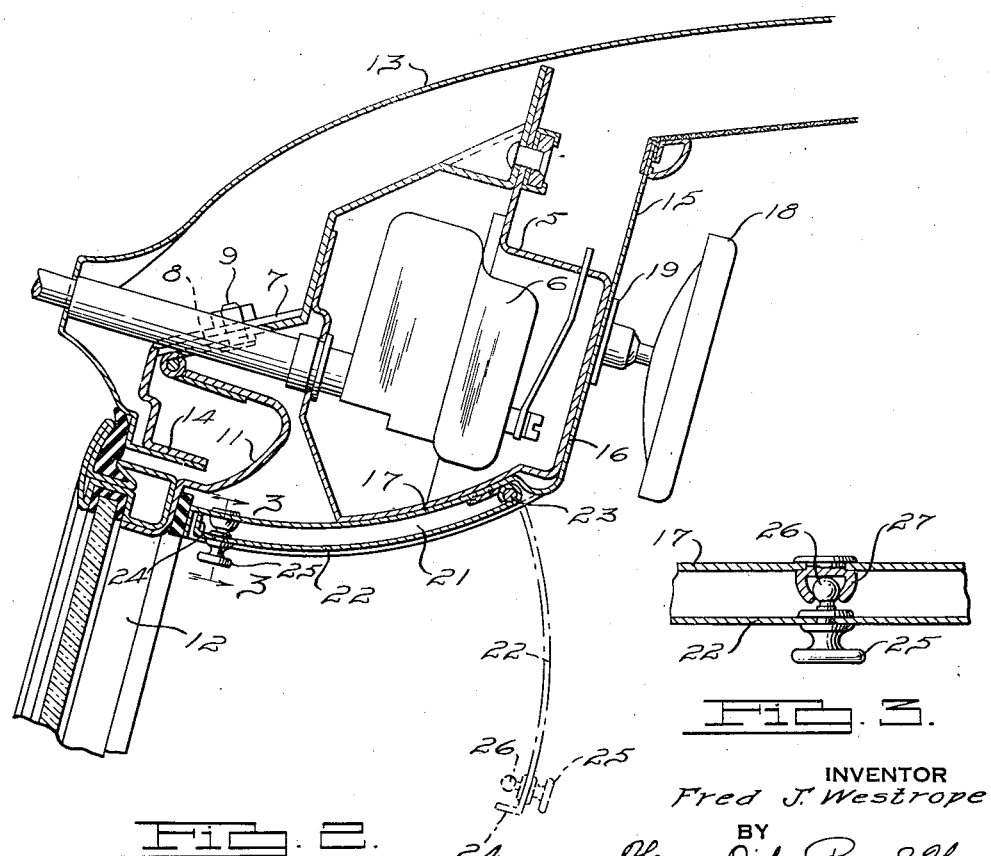
Fig. 2.
Fig. 3.
INVENTOR
Fred J. Westrope.
BY
Harness, Dickey, Pierce & Hann.
ATTORNEYS.

Patented Mar. 24, 1936

2,034,849

UNITED STATES PATENT OFFICE 2,034,849

VISOR NESTED IN RECESS OF HEADER PANEL

Fred J. Westrope, Detroit, Mich., assignor to The Murray Corporation of America, a corporation of Delaware Application April 13, 1932, Serial No. 605,022

2 Claims. (Cl. 296—95)

My invention relates to visors for vehicles and particularly to a visor supported on the interior of the vehicle and so mounted that it may be disposed within the header panel to be substantially invisible when not in use.

Visors have been employed heretofore both exteriorly and interiorly of the vehicle body, both types of which provided an unsightly appearance to the body because of their exposed position when not in use.

My invention is an improvement over the visors heretofore employed and has for its main objects: the provision of a header panel having one or more outwardly presenting offset portions in which the visors may be disposed when not in use, flush with the panel surface; to provide friction hinges on the upper edges of the visors and the indented portions, for hingedly supporting the visor and for providing sufficient friction for retaining the visor in a predetermined position; to provide a flange about the edge of the visor to provide strength thereto of a depth substantially equal to that of the indented portion to assure the flush relation of the visor with the panel; to provide an operating knob or handle on the visor by which the position of the visor is adjusted; to provide latch means for releasably securing the visor in raised position, that is to say in a position flush with the panel; and, in general, to provide a panel for the front bow or header of a vehicle body in which one or a plurality of visors are disposed, flush with the surface thereof.

Other objects and features of novelty of my invention will be either specifically pointed out or will become apparent when referring, for a better understanding of my invention, to the following description in conjunction with the accompanying drawing, wherein:

Figure 1 is a view in elevation of the interior paneling provided on a header of a vehicle body which embodies features of my invention.

Fig. 2 is an enlarged view of the structure illustrated in Fig. 1 taken on the line 2—2 thereof, and Fig. 3 is an enlarged sectional view of the structure illustrated in Fig. 2 taken on the line 3—3 thereof.

My invention comprises in general a header for a vehicle body which is of box section structure having means for supporting a windshield wiper motor 6 and a frontwardly extended flanged portion 7 to which a hinge 8 is attached by bolts 9. The hinge supports a curved arm 11 which is attached to a windshield 12 for permitting the windshield to be swung about the hinge 8 to open or closed position. The front roof paneling 13 extends over the header 5 and is welded or otherwise secured to the inwardly presenting end 14 of the flanged member 7. It is to be understood that the header 5 is supported on front pillars (not shown) in a conventional manner and that the front roof paneling 13 engages the side quarter panels of the vehicle.

A finish panel 15 is provided on the inner side of the header 5, being welded or otherwise secured thereto at 16 and 17, to provide an inner finish for the header. A mirror 18 is attached to the finished panel 15 by the brackets 19 to provide a rear view for the vehicle operator. The under side of the finish panel 15 is provided with one or more indented portions 21 herein illustrated as being two in number formed by drawing the metal inwardly from the lower face of the panel. In the indented portion thus formed I provide visors 22 which are made of metal although suitable other material may be utilized, such as celluloid, Bakelite or the like, which is of sufficient rigidity to retain its predetermined form.

The visor is made of such length and breadth as to fit snugly within the indented portion 21 to be substantially flush with the surface thereabout. A hinge 23 is secured to one end of each visor and the upper portion of the metal of the indented portions 21 of the panel and may be of such length as to extend across the entire width of the visor. Such a hinge is of the piano type and may be an entirely separate hinge or, as illustrated in Fig. 2, may have one portion thereof formed by the end of the visor. It is to be understood that it is within the purview of my invention to employ a plurality of hinges in place of the one hinge herein illustrated.

I have illustrated a flange 24 on the lower end of the visor which may extend along the side thereof forming a substantially closed structure for strengthening the visor so that it may be made of thin gauge material. It is to be understood that when thicker materials are utilized in the visor construction the flanges may be omitted from one or all of its sides. A knob 25 is attached to the opposite edge of the visor 22 from that to which the hinge 23 is secured, which may be grasped by the operator to effect the adjustment of the visor to any position in which it will be retained by the friction provided in the hinge 23.

Suitable retaining means is employed for retaining the visor in raised position, that is to say, in nested relation in the panel 15, which I have illustrated as comprising a ball 26 which may be a portion of the knob 25 but on the opposite side of the visor. The ball registers in a spring clip 27 which is provided on the panel 15 to releasably retain the visor in raised position. It is to be understood that other means may be utilized for adjusting the panel in predetermined position and for retaining it in its raised or nested position, the ones herein shown being employed primarily for the purpose of illustration.

In normal operation of the vehicle, the visor will be in raised position, which is that illustrated in Fig. 2, with the ball 26 secured within the spring clip 27 and when light from the sun, headlights, or other sources interfere with the vision of the vehicle operator the knob or knobs 25 may be grasped and the visor or visors 22 adjusted to a position which will shield the operator's eyes from the light.

It will thus be seen that I have provided a finished panel for the header of a vehicle body upon which one or more visors are mounted and normally retained nested within the interior finish panel of the body to form a substantially continuous surface therewith. The visors are mounted in such manner as not to interfere with a rear vision mirror which is also supported on the panel. Suitable means are provided for moving the visor to any position and latching means are employed for retaining the visor in nested relation with the panel.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. In an automotive vehicle body having, in combination, a metal finish panel on the inner surface thereof provided with a recessed portion of a size and shape conforming to that of a visor, a visor hinged to said panel in such manner as to be received in said recess portion substantially flush with the surface of said panel, means for releasably retaining said visor in said recess, and an element on the front surface of said visor by which its release is effected from said retaining means and by which it is moved to any predetermined position.

2. In a vehicle body, the combination with a header including an inner and an outer metal finish panel, an inner lining in extension of said inner metal finish panel, a windshield interfitted with said header, and a visor supported on the inner metal finish panel of said header by means which permit the lowering of said visor to intercept a plane between the vehicle operator and the windshield.

FRED J. WESTROPE.